United States Patent [19]

Heinrich et al.

[11] 4,357,371
[45] Nov. 2, 1982

[54] PROCESS FOR THE MANUFACTURE OF TUBULAR PACKAGING SHEATHS HAVING A COATING ON THE INSIDE, AND APPARATUS FOR CARRYING OUT THE PROCESS

[75] Inventors: Wolfgang Heinrich, Salach; Max Bytzek, Wiesbaden; Klaus-Dieter Hammer, Mainz; Martin Schröder, Wiesbaden, all of Fed. Rep. of Germany

[73] Assignee: Hoechst Aktiengesellschaft, Frankfurt am Main, Fed. Rep. of Germany

[21] Appl. No.: 247,946

[22] Filed: Mar. 26, 1981

[30] Foreign Application Priority Data

Mar. 28, 1980 [DE] Fed. Rep. of Germany ....... 3012250

[51] Int. Cl.³ .......................... B05D 1/40; B05D 7/22
[52] U.S. Cl. .................................... 427/238; 427/230;
427/394; 118/18; 118/20; 118/44; 118/56;
118/105; 118/106; 118/117; 118/DIG. 10;
118/408; 428/36; 426/135; 426/138; 138/118.1
[58] Field of Search ............... 427/177, 230, 238, 394,
427/398.1; 118/18, 20, 26, 44, 56, 67, 105, 106,
117, DIG. 10, 408; 426/135, 138; 138/118.1

[56] References Cited

U.S. PATENT DOCUMENTS

| | | |
|---|---|---|
| 2,210,436 | 8/1940 | Weingand et al. |
| 2,901,358 | 8/1959 | Underwood et al. ............... 99/176 |
| 3,378,379 | 4/1968 | Shiner et al. ........................ 99/176 |
| 3,413,169 | 11/1968 | Krings et al. |
| 3,567,495 | 3/1971 | Gajdos ................................. 117/95 |
| 4,287,217 | 9/1981 | Hammer et al. .................... 426/105 |

FOREIGN PATENT DOCUMENTS

| | | |
|---|---|---|
| 1545 | 5/1979 | European Pat. Off. |
| 733205 | 1/1945 | Fed. Rep. of Germany ...... 426/135 |
| 1786517 | 8/1972 | Fed. Rep. of Germany |
| 2505207 | of 0000 | Fed. Rep. of Germany |
| 2557994 | 6/1977 | Fed. Rep. of Germany |
| 2659000 | 7/1978 | Fed. Rep. of Germany |
| 2856253 | 7/1980 | Fed. Rep. of Germany |
| 984026 | 2/1965 | United Kingdom |
| 1201830 | 8/1970 | United Kingdom |

Primary Examiner—Shrive P. Beck
Attorney, Agent, or Firm—Schwartz, Jeffery, Schwaab, Mack, Blumenthal & Koch

[57] ABSTRACT

Disclosed is a process for forming an uninterrupted coating of uniform thickness on the inside of a length of tubing which comprises the steps of forming a loop of tubing with a downwardly inclined portion and an upwardly inclined portion; filling the cavity of the tubing forming the loop with a coating liquid; transporting the tubing along its longitudinal axis in a substantially vertically upward direction to coat the inside of the tubing, above the level of the coating liquid, with an initial layer of coating material; constricting the tubing to lay partially flat along a narrow zone running transverse to the direction of transportation above the level of the coating liquid to retain the greater part of the coating liquid in the constriction zone and form a thin layer of coating liquid of desired thickness on the inside; of the tubing issuing from the constriction zone; filling the cavity of the tubing issuing from the constriction zone with support gas; and exposing the tubing to the action of heat at a sufficiently high temperature to fuse the coating layer to the inside of the tubing and form an uninterrupted film of uniform thickness on the inside of the tubing. Also disclosed is an apparatus for carrying out the process of the present invention.

19 Claims, 2 Drawing Figures

PROCESS FOR THE MANUFACTURE OF TUBULAR PACKAGING SHEATHS HAVING A COATING ON THE INSIDE, AND APPARATUS FOR CARRYING OUT THE PROCESS

BACKGROUND OF THE INVENTION

The present invention generally relates to processes for the production of tubular packaging sheaths made from cellulose hydrate with a uniformly uninterrupted film coating of natural or synthetic polymer on the inside, the coating being virtually impermeable to water and water vapor, and to an apparatus for carrying out the processes. More particularly, the invention relates to processes for the production of a tubular packaging sheath for pasty foodstuffs, especially as a synthetic sausage casing for sausage intended to be boiled or cooked and to an apparatus for carrying out the processes.

British Patent Specification No. 1,201,830 describes a process for the internal coating of tubular packaging sheaths made from cellulose hydrate with an aqueous polymeric dispersion by continuously passing the tubing horizontally through the nip of a vertical pair of nip rolls and thereafter deflecting the tubing to a vertical direction by means of a deflecting roller. The cavity of the portion of tubing issuing from the nip of the pair of nip rolls contains a certain amount of aqueous polymeric dispersion as a coating liquid. The vertically running tubing is exposed to heat above the level of the quantity of coating liquid enclosed in the cavity of the tubing.

In a process for the internal coating of cellulose hydrate tubing with an aqueous plastic solution disclosed in U.S. Pat. No. 2,901,358, the tubing to be coated is first guided horizontally in a flattened form and then partially wrapped around the circumference of one roll of a horizontal pair of nip rolls, passed through the nip of this pair and thereafter guided vertically upwards. A certain amount of coating liquid is enclosed in the tubing cavity above the nip of the pair of rolls. The exposure to heat, in order to dry the layer on the inside of the tubing, takes place after the tubing is pressed flat in the nip of a pair of nip rolls.

German Offenlegungsschrift No. 2,801,038 discloses a process for the internal coating of tubing wherein tubing made of plastic or of a dense fabric is continuously passed through the metering nip of a vertical pair of nip rolls and then is passed in an upwardly-inclined direction. Before entering the nip of the pair of rolls, the tubing first rests, in flattened form, partially against the circumference of the lower roll of the pair of rolls, and after issuing from the metering nip it rests, in flattened form, partially against the upper roll. After the flattened tubing has been lifted off the surface of the upper roll of the pair of rolls, it proceeds in an upwardly-inclined direction. The coating liquid contained in the portion of the tubing, is upstream of the pair of nip rolls.

The known processes for the internal coating of cellulose hydrate tubing with aqueous polymeric dispersions all have the disadvantage that the cellulose hydrate tubing, which, because of the high water content of the polymeric dispersion used, is heavily moistened with water, tends on subsequent drying to undergo an undesirable change of dimension due to shrinkage. They further all have the disadvantage that because of the use of aqueous polymeric dispersions having a relatively low content of dispersed polymer, the amount of water which has to be expelled in order to form the film coating on the inside of the tubing by exposing the tubing to heat, and transported outwards through the tubing wall by diffusion, is large in relation to the amount of the dispersed polymer component of the dispersion. The known processes accordingly are disadvantageous in energy terms.

In the text which follows, a horizontal pair of rolls is to be understood as a pair of rolls in which a common substantially horizontal plane can pass through the parallel axes of its rolls. A vertical pair of rolls is to be understood, by definition, as a pair of rolls in which the parallel axes of its rolls extend in a common substantially vertical plane.

SUMMARY OF THE INVENTION

Accordingly, it is the object of the present invention to provide processes for forming a uniformly thick uninterrupted film coating of a polymer on the inside of cellulose hydrate tubing, using an aqueous polymeric dispersion as the coating liquid, which can be carried out in an advantageous manner with respect to energy consumption and in which virtually no undesired change in dimensions of the tubing, through shrinkage, occurs in the course of carrying out the process.

A further object of the present invention is to provide processes which can be carried out utilizing a polymeric dispersion with a relatively high concentration of dispersed polymeric components to reduce water absorption by the tubing.

Yet another object of the present invention is to provide an apparatus for carrying out the processes.

In order to accomplish the foregoing objects in accordance with the present invention, there is provided a process for forming an uninterrupted coating of uniform thickness on the inside of a length of tubing essentially consisting of cellulose hydrate, comprising the steps of forming a loop of tubing with a downwardly inclined portion and an upwardly inclined portion; filling the cavity of the tubing forming the loop with a coating liquid; transporting the tubing along its longitudinal axis in a substantially vertically upward direction to coat the inside of the tubing above the level of the coating liquid with an initial layer of coating material; constricting the tubing to lay partially flat along a narrow zone running transverse to the direction of transportation above the level of the coating liquid to retain the greater part of the coating liquid in the constriction zone and form a thin layer of coating liquid of desired thickness on the inside of the tubing issuing from the constriction zone; filling the cavity of the tubing issuing from the constriction zone with support gas; and exposing the tubing to the action of heat at a sufficiently high temperature to fuse the coating layer to the inside of the tubing and form an uninterrupted film of uniform thickness on the inside of the tubing.

In accordance with a preferred embodiment of the present invention, the coating liquid comprises an aqueous polymeric dispersion having a content of dispersed polymer of at least 20% by weight relative to the total weight of the dispersion, and more preferably, in the range of about 20 to 60% by weight relative to the total weight of the dispersion.

In accordance with another aspect of the invention, the constriction step comprises guiding the tubing through a constriction zone formed by a pair of spaced rolls arranged on either side of the tubing to gradually flatten the tubing and prevent the formation of folds in front of the constriction zone. The rolls are spaced sufficiently to insure that the thin layer of coating liquid on the tubing issuing from the constriction zone has a thickness corresponding to a weight per unit area in the range of about 6 to 20 g of dispersed component per m$^2$ of tubing surface.

In accordance with a preferred embodiment of the present invention, the process further includes the step of smoothing the thin layer of coating liquid on the inside of the tubing issuing from the constriction zone but before heating to provide a coating of uniform thickness.

In accordance with yet another aspect of the invention, the smoothing step comprises passing the tubing between a pair of rolls positioned on either side of the tubing and in contact with the outer wall thereof to partially lay flat the tubing and transmit a frictional force thereto. The rolls can be directly across from one another or displaced from one another along the longitudinal axis of the tubing.

In accordance with the present invention there is provided an apparatus for coating the inside of a length of tubing comprising means for forming a loop of tubing having a downwardly inclined portion and an upwardly inclined portion; means for filling the tubing cavity forming the loop with a coating liquid; means for transporting the tubing along its longitudinal axis in a substantially vertically upward direction; a metering device having a pair of rolls positioned on either side of the tubing to form an adjustable constriction zone; and a heater.

In accordance with the present invention, the apparatus further comprises means for smoothing the coating on the inside of the tubing, the smoothing means being positioned after the metering device and before the heater, wherein the smoothing means comprises a pair of rotatable smoothing rolls positioned on either side of the tubing and in contact with the outer surface thereof to partially lay flat the tubing.

Further objects, features and advantages of the present invention will become apparent as the following description of preferred embodiments proceeds, and with particular reference to the application drawings.

DETAILED DESCRIPTION OF PREFERRED EMBODIMENTS

Figure 1:
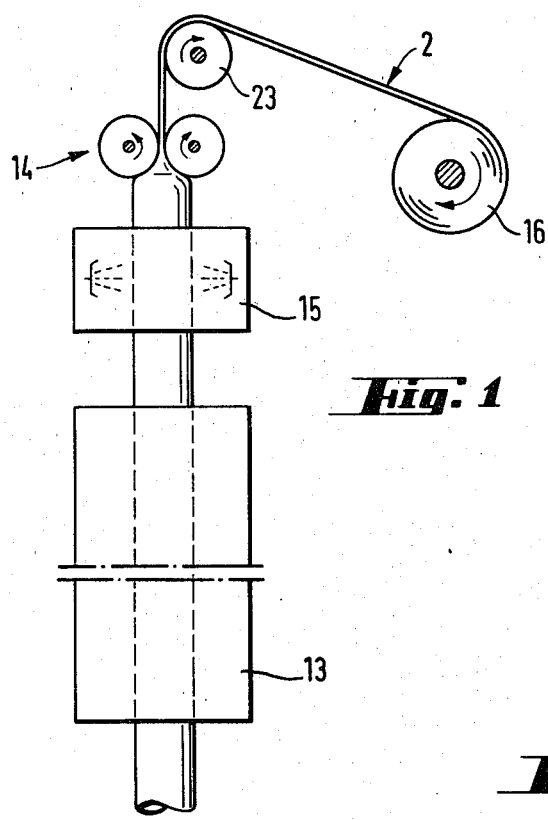
FIG. 1 illustrates an apparatus for carrying out one embodiment of the present invention.

The object underlying the invention is achieved by a process for the manufacture of tubing having a polymeric film coating on its inside, by coating the inside of a long piece of tubing, in which the tubing partially filled with a certain amount of coating liquid is transported at a constant speed in the direction of its longitudinal axis and passed continuously through the nip of a pair of metering rolls, which nip is set so that the greater part of the coating liquid is retained in the roll nip and only a film of low thickness of the coating liquid is formed on the inside of the tubing issuing from the nip of the pair of metering rolls. The tubing is transported in the direction of its longitudinal axis, first in a downward direction and thereafter in an upward direction, with the upwardly transported part of the tubing continuously entering the nip of the pair of metering rolls and the quantity of coating liquid enclosed in the tubing cavity being located in the region of the tubing loop. A cellulose hydrate tubing which possesses an adhesion-promoting layer on its inside is used, and an aqueous polymeric dispersion containing not less than 20% by weight of dispersed polymer, relative to the total weight of the dispersion, is used as the coating liquid. The upwardly transported part of the tubing loop is led substantially vertically and, above the level of the portion of the coating liquid enclosed in its cavity, is partially flattened continuously along a straight, line-like narrow zone running parallel thereto. Thereafter the tubing, filled with support gas and carrying a thin layer of aqueous polymeric dispersion on its inside, is led substantially vertically upwardly and exposed to the action of heat at a sufficiently high temperature to expel the dispersion medium from the thin layer of aqueous polymeric dispersion on the inside of the tubing by diffusion of the medium through the tubing wall, with formation of an uninterrupted film coating. After the heat treatment the tubing is moistened with water if appropriate, pressed flat continuously over its entire width along a narrow linear zone and then wound up on a driven stock reel.

In carrying out the process, the tubing is continuously unwound from a reel and is transported at constant speed in the direction of its longitudinal axis and, as the last step in carrying out the process, is wound up continuously on a stock reel which is designed to be rotatable and drivable, and which is driven.

The process is carried out by transporting the tubing at a speed which is advantageously in the range of about 8 to 120 m/min; a speed of transportation of the tubing in the range of between about 20 and 80 m/min is particularly advantageous.

An aqueous polymeric dispersion which contains a high proportion of dispersed polymer relative to the amount of dispersion medium is used to carry out the process. An aqueous polymeric dispersion with a high proportion of dispersed polymer, relative to the total weight of the aqueous dispersion, is considered to be a dispersion which contains at least 20% by weight of dispersed polymer; aqueous polymeric dispersions which contain an amount in the range from about 20 to 40% by weight of dispersed polymer, relative to the total weight of the dispersion, are particularly advantageous.

Aqueous polymeric dispersions suitable for carrying out the process are especially those wherein the dispersed polymer is able, after expulsion of the dispersion medium by sufficient heat, to form films, in particular films which are virtually impermeable to water and water vapor. Preferred aqueous polymeric dispersions are those which contain, as the dispersed polymer component, copolymers containing a preponderant proportion of copolymerized vinylidene chloride, advantageously those which contain at least about 75% by weight of copolymerized vinylidene chloride. Very particularly suitable aqueous polymeric dispersions are those, having the stated concentration, which contain, as the dispersed polymeric component, copolymers which are described in German Auslegeschrift No. 2,512,995 and German Pat. No. 2,512,994. The polymers and polymeric dispersions are not a subject of the present invention.

The cellulose hydrate tubing which is used to carry out the invention and is preferably fiber-reinforced, advantageously has a swelling value (water retention capability) in the range of 120 to 140% (DIN 53814).

The cellulose hydrate tubing, for example, has a wall thickness in the range of about 30 to 300 μm, advantageously in the range of about 80 to 120 μm.

Fiber-reinforced cellulose hydrate tubing is to be understood as tubing which contains a fiber web embedded in its wall. The fiber insert in the tubing wall does not hamper the diffusion of water through the wall.

The preferred fiber-reinforced cellulose hydrate tubing advantageously has, in its wall, a water content in the range from about 8 to 12% by weight, relative to the total weight of the tubing, and a content in the range of about 18 to 24% by weight, advantageously of about 22% by weight, of a chemical agent capable of plasticizing cellulose hydrate, for example glycerol, glycol or polyglycol. The percentage by weight data in each case relate to the total weight of the fiber-reinforced cellulose hydrate tubing.

The cellulose hydrate tubing described above, which preferably is fiber-reinforced and contains a chemical plasticizer and water, is not, per se, a subject of the present invention.

The tubing carries, on its inside, a layer of a chemical agent which is permeable to water and water vapor, for example, a layer of a water-insoluble reaction product, formed by heat curing, of epichlorohydrin and a polyamine-polyamide, for example, a layer having a thickness corresponding to a weight per unit area of, for instance, about 30 to 100 mg/m² of the said reaction product; the layer has an adhesion-promoting action and results in firm bonding of the plastic coating to the substrate in the process product. The above-mentioned cellulose hydrate tubing with an adhesion-promoting layer is not, per se, a subject of the present invention.

The initial tubing or process starting material referred to and used is advantageously a fiber-reinforced cellulose hydrate tubing which has a swelling value of about 120 to 140%, for example, of about 130%, a water content of about 8 to 12% by weight, for example, of about 10% by weight, and a glycerol plasticizer content of about 18 to 24% by weight, for example, of about 22% by weight, and which possesses, on its inside, a water-permeable and water vapor-permeable, thin adhesion-promoting layer of a chemical substance, for example, a layer of a thickness corresponding to about 30 to 100 mg/m² of a water-insoluble reaction product of epichlorohydrin and a polyamine-polyamide.

The process is carried out in such a way that the polymeric film coating on the inside of the end product of the process (the process product) has a thickness corresponding to a weight per unit area in the range of advantageously, about 6 to 20 g of polymer per m² of substrate surface, preferably about 8 to 12 g of polymer per m² of substrate surface.

The film coating is physically homogenous, uniformly thick and uninterrupted.

The manner of carrying out the process according to the invention will be described below by way of example; to carry out the process, a particularly suitable apparatus is used, and this will also be described.

The initial tubing, for example, has a diameter of about 90 mm, with a layflat width of about 143 mm. A long piece of the tubing, for example, having a length of about 350 m, is wound in layflat form on a rotatably constructed stock drum mounted in a fixed position.

The tubing is continuously unrolled from the stock reel and is transported along its longitudinal axis direction, to form a loop of tubing, first in a downward direction and thereafter, following a change of direction, for example, by means of a rotatably constructed guide roller, in an upward direction, at a constant speed, for example, of about 30 to 40 m/min. In the cavity of the piece of tubing which forms the tubing loop, there is a certain amount of aqueous polymeric dispersion, for example, 4 liters of a dispersion, for example, of 30 percent strength by weight, in which the dispersed polymer component, for example, comprises about 88% by weight of copolymerized vinylidene chloride, about 3% by weight of copolymerized acrylic acid, about 4% by weight of copolymerized acrylonitrile and about 5% by weight of copolymerized methyl acrylate, the percentages by weight in each case relating to the total weight of the dispersed copolymer. A dispersion of the stated concentration can be prepared for example, by starting from a dispersion which contains a relatively high concentration, for example, 55% by weight of dispersed copolymer, and bringing it, by dilution with water, to the concentration appropriate for carrying out the process.

The tubing, filled with a predetermined amount of coating liquid in the form of an aqueous polymeric dispersion of the stated concentration is led, in the form of a tubing loop, along its longitudinal axis, in its direction of transportation, first downwardly and then, after a change of direction, for example, by means of a guide roller, substantially vertically upwardly.

The stock amount of aqueous polymeric dispersion required to coat the inside of the total length of the cellulose hydrate tubing with a polymeric film coating is introduced into the cavity of the tubing at the beginning of the process so that the cavity of the vertical part of the tubing loop is partially filled with coating liquid.

Sufficiently far above the level of the proportion of the coating liquid stock contained in the vertical part of the tubing loop, the tubing is partially flattened continuously along a straight, line-like narrow zone which extends parallel to the liquid level.

The statement that the tubing is partially flattened is to be understood as meaning that the measure leads to a tubing which, in the region in which it is partially flattened, is characterized by a three-dimensional shape in which it has a cavity whose cross-section is of virtually the same height over the entire width of the cavity. The distance between the parallel straight portions of the tubing wall is advantageously so chosen as a function of the speed of transportation of the tubing and the concentration of the aqueous polymeric dispersion, that their inner faces delimit a gap which corresponds to twice the tubing wall thickness plus twice the thickness of a liquid layer of an aqueous polymeric dispersion of the stated concentration, which layer is such that after expulsion of the dispersion medium it gives a film coating of a thickness corresponding to a weight per unit area in the range of, advantageously, from about 6 to 20 g of polymer per m² of the inner surface of the process end product.

The term "tubing with support gas in its cavity and a thin liquid layer of aqueous polymeric dispersion of the stated concentration on its inner surface" is defined to embrace parts of the tubing which have an elliptical cross-section or a circular or virtually circular cross-section, as well as parts of the tubing, filled with support gas and possessing a thin liquid layer of aqueous polymer dispersion of the stated concentration on their inside, whose three-dimensional shape is determined by the fact that they possess a cavity having a cross-section of virtually the same height over the entire width of the cavity and that the parallel straight portions of the tubing wall are at such distance from one another that the thin liquid layer of aqueous polymeric dispersion, present on their inner surfaces, do not touch each other.

By a thin liquid layer of aqueous polymeric dispersion on the inside of the tubing filled with support gas, there is to be understood a layer which is of lesser thickness than the layer which is present on the inside of the vertically transported tubing before it is partially flattened in the metering nip of the pair of metering rolls and which, after expulsion of the dispersion medium, gives an uninterrupted, uniformly thick film coating having a thickness corresponding to a weight per unit area of, advantageously, 6 to 20 g of polymer per $m^2$ of the inner surface of the tubing. The appropriate relative balance of the stated process parameters can be determined for each case in a simple manner by a few simple preliminary experiments.

The term "tubing with support gas in the tubing cavity" relates, in both of its three-dimensional variants, to the tubing which issues from the metering nip of the substantially horizontal pair of metering rolls and runs vertically upwardly, and carries a thin liquid layer of aqueous polymeric dispersion on its inside walls. Air is the preferred support gas.

The particular shape of the tubing with support gas in the cavity is ensured by a pressure of support gas adequate for maintaining the desired cross-sectional shape. In the case of tubing of circular cross-section filled with support gas, the support gas can also exert a pressure on the inner wall of the tubing, which, to a slight degree, can cause radial stretching of the tubing.

The tubing transported vertically upwardly and having a liquid, relatively thick layer of aqueous polymeric dispersion on its inside is continuously, partially flattened by passing it continuously through the metering nip, set to a certain nip width, of a horizontal pair of metering rolls. The pressure thereby exerted on the tubing by the rolls of the pair of rolls leads, according to the set width of the metering nip of the pair of rolls, to corresponding partial flattening of the tubing in the metering nip. The tube, prior to its entering into the metering nip, is advantageously supported by means to prevent the formation of creases, such as those, for example, used for the production of synthetic foil tubes, for example, with the aid of guide plates, guide rolls, conveyers, or roll conveyers, running toward the metering nip in a conical manner.

The metering nip of the horizontal pair of metering rolls advantageously has a width in the range of about 200 to 400 $\mu$m, preferably in the range of about 220 to 300 $\mu$m.

The width of the metering nip is selected, in appropriate balance, with the speed of transportation and concentration of the dispersion so that it corresponds to twice the wall thickness of the tubing plus twice the thickness of a thin, liquid layer of aqueous polymeric dispersion on the inside of the tubing which contains support gas in its cavity, the liquid layer being of such thickness that after expulsion of the dispersion medium from it, a polymeric film coating having a thickness corresponding to a weight per unit area in the range of, advantageously about 6 to 20 g of polymer $m^2$ of inner tubing surface results.

The speed of transportation of the tubing, for example, about 30 m/min, the concentration of the aqueous polymeric dispersion used, for example, about 30% by weight, and the width of the metering nip, for example, about 230 $\mu$m of the horizontal pair of metering rolls, conjointly determine the thickness, for example, about 10 $\mu$m of the thin, liquid layer of aqueous polymeric dispersion on the inside of the tubing which leaves the metering nip.

If required, the width of the metering nip of the horizontal pair of metering rolls and/or the speed of transportation of the tubing can also be varied without interrupting the process sequence.

The partial flattening of the tubing in the metering nip of the horizontal pair of metering rolls not only has the consequence that a thin, liquid layer having a certain weight per unit area forms on the inside of the "tubing with support gas in its cavity", but also that this thin layer is very uniform over the entire length of the tubing (the metering nip of the horizontal pair of metering rolls exerts both a metering action and an evening-out action).

The partial flattening of the tubing in the metering nip has the effect, depending on the set width of nip and depending on the speed of transportation of the tubing as well as on the concentration of the aqueous polymeric dispersion used, that aqueous dispersion builds up in the tubing cavity immediately before the metering nip, i.e., in the cavity of the portion of tubing which has been partially flattened by the metering nip, and that the cavity of the portion of tubing becomes completely filled.

The appropriate mutual balance of the stated process parameters can be determined in a simple manner for each individual case by a few simple preliminary experiments. If required, the width of the metering nip of the horizontal pair of metering rolls and/or the speed of transportation of the tubing can also be varied without interrupting the process sequence.

The tubing which leaves the metering nip of the horizontal pair of metering rolls and is filled with support gas and carries a thin layer of aqueous polymeric dispersion, is led substantially upwardly and exposed to the action of heat at a sufficiently high temperature to expel the dispersion medium of the thin, liquid layer on the inside of the tubing and thereby to form an uninterrupted polymeric film coating on the inside of the tubing.

Before exposure to heat, the "tubing with support gas in its cavity" is advantageously passed through a gas zone of a certain length. The length of this zone is advantageously about 40 to 60 cm. The gas in the region of the gas zone is at room temperature.

The amount of support gas required in the cavity of the piece of tubing which has issued from the metering nip of the pair of metering rolls is introduced into this cavity at the start of carrying out the process; the internal pressure in the tubing is maintained, whilst carrying out the process, by continuously pressing flat the tubing, after the polymeric film coating has formed, along a narrow zone over its entire width, for example, by passing it through the gap of a pair of squeeze rolls.

The rolls of the pair of squeeze rolls are constructed to be rotatable and drivable and are driven, for example, by motors; the rolls each have the same direction of rotation.

As a result of the frictional pressure contact of the outer faces of the tubing with the respective circumferential surfaces of the squeeze rolls, the transportation of the tubing in the stated direction takes place at a speed corresponding to the circumferential speed of the driven rolls of the nip pair. Further, means for preventing the formation of creases in the tubing can be positioned, in front of the squeeze rolls.

After drying the tubing by exposing it to heat and forming a film coating on its inside, and before pressing the tubing flat in the nip of a pair of squeeze rolls, the tubing is, if appropriate, moistened with water, for example, by spraying therewith, and is thereby, advantageously, brought to a water content in the range of about 8 to 12% by weight, for example, a content of about 10% by weight, in each case relative to the total weight of the tubing. The tubing is then wound up on a reel which is designed to be rotatable and drivable, and which is driven. The circumferential speed of the driven stock reel is, for example, in the range of about 8 and 120 m/min; for example, the reel has a circumferential speed of about 30 m/min.

The rolls of the first (viewed in the direction of transportation of the tubing) horizontal pair of metering rolls having a metering nip are each constructed rotatable and are drivable. The metering rolls can be driven by means of motors. The rolls of the horizontal pair of metering rolls are driven in such a way that their direction of rotation corresponds to the forward direction of transportation of the tubing.

One of the two rolls of the horizontal pair of metering rolls having a metering nip is adjustably constructed so that it can be brought up against the other roll; the desired width of the metering nip can be adjustably set, and fixed in the desired position, by corresponding horizontal shift of the roll belonging to the pair of metering rolls, which can be brought up against the other roll. The pair of metering rolls is mounted as a unit in a fixed position.

The heat exposure of the tubing, to dry the liquid layer of aqueous dispersion on the inside of the tubing filled with support gas, is effected, for example, by passing the tubing vertically upwardly through a straight drying tunnel, for example, a tunnel equipped with infrared heating elements. By way of example, the tubing is heated to a temperature of about 80° C. at the beginning of the drying tunnel and to a temperature of about 140° C. at the end of the tunnel.

The moistening with water of the tubing which has been dried by the action of heat can be effected by means of a spray nozzle fed with water or any suitable fluid, the tubing being led past the nozzle and being sprayed.

According to an alternative embodiment of the invention, the process is carried out in the following manner, which constitutes a modification relative to the first process variant: the tubing issuing from the metering nip of the pair of metering rolls, which is partially flattened and filled with support gas and has a thin, liquid layer of aqueous polymeric dispersion on its inside is led substantially upwardly so that its outer faces are subjected continuously, over their entire width, along a straight, narrow zone, to a frictionally transmitted force, in such a manner that the mutually facing surfaces of the liquid layer of aqueous polymeric dispersion, on the inside of the tubing, do not come into contact with one another. For this purpose, the stated zones of the outer faces of the tubing are each brought continuously into frictional contact with a part of the total circumferential surface of one of each of a pair of smoothing rolls which are rotatable about their axes and are driven. The roll axes of rotation are transverse to the direction of transportation of the tubing. Advantageously, this is done by first bringing one outer face of the partially flattened tubing filled with support gas and having a liquid layer on its inside into frictional contact with a part of the circumferential surface of a first (viewed in the direction of transportation of the tubing) roll of a pair of smoothing rolls, and thereafter bringing the other outer face of the tubing into frictional contact with a part of the circumferential surface of a second (viewed in the direction of transportation of the tubing) roll, located above the first smoothing roll of the pair of rolls.

The straight narrow zones, wherein the outer face of the tubing is in each case in frictional contact with a part of the circumferential surface of one smoothing roll of the pair of smoothing rolls, are each narrow relative to the width of the partially flattened tubing filled with support gas.

The pair of smoothing rolls, which (viewed in the direction of transportation of the tubing) is above or upstream of the pair of metering rolls and below or downstream of the drying tunnel and wherein the parallel-spaced circumferential surfaces of the rolls define a nip space in the region of their mutually facing partial circumferential surfaces, is constructed so that the axis of rotation of each roll is substantially transverse to the direction of transportation and is preferably horizontal. Advantageously, the rolls of the pair of smoothing rolls are arranged relative to one another so that they each run in horizontal planes which are parallel to and at a distance from one another, with the roll nearer the pair of metering rolls referred to as the first roll, and the other roll as the second roll of the pair of smoothing rolls.

The two smoothing rolls are preferably of the same diameter and made from material which imparts dimensional stability to them. Preferably, the rolls have a smooth surface and are made of steel.

The smoothing rolls are each mounted in a fixed position and are constructed to be rotatable about their axes. The smoothing rolls are each drivable and are each driven by motors. The direction of rotation of the smoothing rolls is advantageously in each case counter to the direction of transportation of the tubing.

In carrying out the process according to the special embodiment, each of the outer faces of the partially flattened tubing filled with support gas is brought into frictional contact with a part of the circumferential surface of one smoothing roll each, so as to bring about even better evening-out of the liquid layer on the inside of the tubing, before the tubing is subjected to the action of heat. Transporting the tubing in a partially flattened state, filled with support gas, is advantageous because in this way the desired frictional contact of the outer faces of the tubing with the circumferential surfaces of the smoothing rolls is achievable in a simple manner.

The tubing leaving the pair of smoothing rolls is from there transported substantially vertically upwardly and is then, corresponding to the method of carrying out the first process variant, subjected to the action of heat, partially pressed flat at the nip of a pair of squeeze rolls, and rolled up on a driven stock reel. Before the tubing is pressed flat in the nip of the pair of squeeze rolls, it is, if appropriate, moistened with water, for example, by spraying it with water, using a spray nozzle.

The pieces of apparatus appropriate for carrying out the process according to the invention each also comprise the requisite devices for holding the individual elements of the apparatus in a fixed position.

It is characteristic of the process carried out according to the invention, that over the period of time in which the cellulose hydrate tubing is in contact with aqueous polymeric dispersion of the stated concentration, the amount of water taken up from the dispersion by the tubing, or the amount of water which diffuses from the liquid layer into the tubing, is only such that the water content in the tubing is always clearly less than that which corresponds to the swelling value (water retention capacity) of the cellulose hydrate tubing.

The water content of the tubing when carrying out the process is preferably less than 30%, in particular 20 to 30% of the water retention value and only about one-quarter of the amount of water which corresponds to the swelling value of the initial tubing (the swelling value is determined in accordance with DIN 53,814; "Faerberei- and textilchemische Untersuchungen" ("Investigations in Dyeing and Textile Chemistry"), A. Agster, page 450, Springer Verlag 1967, 10th edition).

The advantages of the invention, resulting from what has been described above, over the prior art, are shown by the following comparisons:

To produce a film coating, for example, of a thickness corresponding to a weight per unit area of 10 g of polymer per $m^2$ of tubing surface, it is necessary in the known process, when using an aqueous polymeric dispersion of the customary concentration of, for example 6.5% by weight of dispersion polymer, to expel 143.8 g of water per $m^2$ from the surface of the tubing in the cavity of the tubing by the action of heat on the tubing, in order to form the film coating referred to.

On the other hand, to form a polymeric coating of a thickness corresponding to 10 g of polymer per $m^2$ of tubing surface on the inside of the tubing, it is only necessary, when carrying out the procedure according to the invention and using, for example, a 30% strength by weight polymeric dispersion, to expel 23.3 g of water per $m^2$ of tubing surface by the action of heat on the tubing in order to form the film coating.

The process according to the invention, in both its variants, accordingly only requires, for the production of a polymeric film coating of a thickness corresponding to 10 g of polymer per $m^2$ of tubing surface, one-sixth of the amount of thermal energy which is necessary to form a film coating of the same thickness when carrying out the known coating processes.

Furthermore, because of the small amount of water to be expelled from the liquid layer of aqueous polymeric dispersion in order to form a film on the inside of the tubing, the process according to the invention permits a substantial increase in the coating speed.

In the process according to the invention, coating defects are avoided, due to the relatively high concentration of dispersed polymer in the aqueous polymer dispersion, which is used in carrying out the process, for the following reasons: using, as the process starting material, cellulose hydrate tubing having a swelling value (water retention capacity) of, for example, 120%, it is necessary, in the known processes, when using, for example, a 6.5% strength by weight aqueous polymeric dispersion, and carrying out the process so as to form a film coating corresponding to a thickness of, for example, 10 g of polymer per $m^2$ of tubing surface, that the tubing should take up 143.8 g of water per $m^2$ of tubing surface and that this amount should be transported, by diffusion, through the tubing wall.

In contrast, when carrying out the process according to the invention and using a polymeric dispersion which, for example, contains 30% by weight of dispersed polymeric component, the initial tubing, having the stated swelling value of about 120%, is only lightly moistened. Since the initial tubing, when carrying out the process according to the invention, only shrinks to a virtually insignificant degree because of the low content of water in its tubing wall in the course of its manufacture, it is, in contrast to conventional processes, not necessary to counteract this shrinkage.

Coating flaws which result on radial stretching of the tubing and free run-off if an appropriately high internal pressure is used in the tubing to prevent shrinkage of the tubing, and which are attributable to differences in the tubing wall thickness resulting from the process of manufacture, are avoided when carrying out the process according to the invention.

Since, in order to form the uninterrupted polymeric film coating on the inside of the tubing by expelling the dispersion medium from the liquid layer of aqueous polymeric dispersion on the inside of the tubing, the entire amount of water in the liquid layer must be transported away by diffusion through the tubing wall, the rate of diffusion and the water content of the liquid layer of aqueous dispersion essentially determine the speed with which the coating process can be carried out.

The water content of the thin layer of aqueous polymeric dispersion on the inside of the tubing issuing from the metering nip of the pair of rolls, and having support gas in its cavity, is sufficiently low that when the process is carried out it results in shrinkage of the initial tubing occurring only to an extent which is insignificant in practice.

Accordingly, the internal coating of the tubing can be carried out without the tubing shrinking to an extent which matters in practice.

The advantages of the process according to the invention, in both its embodiments, are briefly summarized below:

1. Use of an aqueous polymeric dispersion having a high content of dispersed polymer; energysaving process operation; possibility of carrying out the process at a speed which is twice to four times as great as the coating speed in known processes, and avoidance of significant shrinkage of the tubing.

2. Controlled metering and evening-out of the dispersion applied; defects due to run-off are avoided.

3. Accumulation of plasticizer in the dispersion reserve has only an insignificant effect on the quality of the film coating, because of the high content of dispersed component.

4. The lengthwise relaxation of the tubing is not adversely affected and the lengthwise distortion can be kept low.

5. A low pressure in the tubing cavity during coating in the metering nip of the pair of rolls requires a correspondingly low external contact pressure, so that the coating edges of the tubing suffer virtually no undesirable change (embrittlement) during subsequent storage of the process product.

6. Because of the use of an aqueous polymeric dispersion having the stated content of dispersed polymer and of dispersion medium, the coating process is virtually independent of the diffusion properties of the initial tubing, and accordingly, the stated increase in coating speed is achievable.

7. Starting from a given amount of initial tubing to be coated on its inside with a film coating of a given thickness, the process is substantially easier to carry out than the known coating processes, because of the lower total amount of aqueous dispersion required for internal coating of the piece of tubing. With this lower total requirement, when coating very long pieces of tubing by the process according to the invention, the coating liquid need not be replenished as often as in the case of known processes, and the waste tubing produced by the tubing incision which has to be made for such replenishment is substantially reduced.

Examples of both embodiments of the process, and of the apparatus suitable for carrying these out, are described below, in relation to the drawings.

In FIG. 1, 1 denotes a stock reel on which the fiber-reinforced cellulose hydrate tubing 2 which is to be coated on its inside is wound up in layflat form. Reference numeral 3 denotes a horizontal pair of rolls, with a metering nip 4, and 5 is a tubing loop. In the cavity of the portion of tubing which forms the tubing loop there is a stock of aqueous polymeric dispersion 6, coming up to the level 7 in the substantially vertical part of the tubing loop. A substantially vertical piece of tubing 8 of circular cross-section exits above level 7 and has a liquid layer 9 of aqueous dispersion on the inside. Reference numeral 10 denotes the tubing 2 which has been partially flattened in the nip 4 of the substantially horizontal pair of rolls 3. There is a build-up 11 of aqueous dispersion material before and in the metering nip, and tubing 12 which issues from the roll nip 4 of the pair of rolls 3 is filled with support gas and runs substantially upwardly. A drying tunnel 13 is supplied with a hot gas for drying the coating tubing, and this is followed by a pair of squeeze rolls 14 which rotatably and drivably constructed driven rolls. A spray device 15 for moistening the tubing 2 with water is optionally interposed between the drying tunnel and the squeeze rolls 14. A drivable and actually driven stock reel 16 is provided on which the tubing is wound up and by means of which it is transported along its lengthwise axial direction. Reference numeral 17 denotes the thin, liquid layer of aqueous polymeric dispersion on the inside of the portion of tubing 12. A first guide roller 22 and a second guide roller 23 are also provided.

Figure 2:
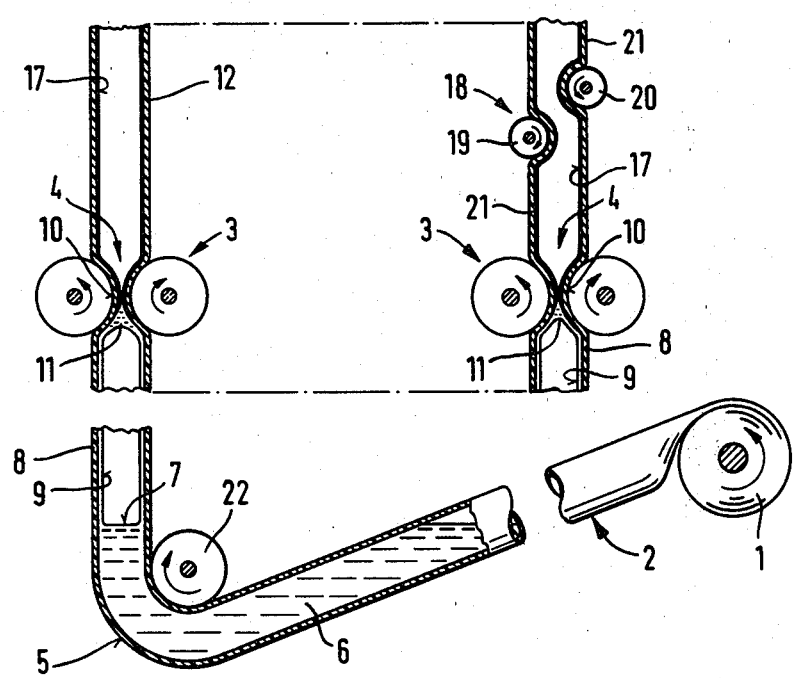
FIG. 2 is a partial side view of an apparatus for carrying out an alternative embodiment of the present invention.

FIG. 2 shows a portion of the apparatus for carrying out the second embodiment of the process, with a pair of smoothing rolls, and shows the essential features in which this embodiment differs from that illustrated in FIG. 1.

In FIG. 2, the numerals 1 to 16 have the same meaning as in FIG. 1. A pair of smoothing rolls 18 is provided having axes of rotation transverse to the direction of transportation of the tubing, with reference numeral 19 being the first and reference numeral 20 being the second smoothing roll of the pair. The partially flattened tubing 2 filled with support gas and having a thin layer of aqueous polymeric dispersion on its inside is passed through the pair of smoothing rolls. In order to simplify the drawing, the mounting of the individual elements of the apparatus and the means for driving the rolls of the horizontal nip roll pair, driving the horizontal smoothing rolls and driving the stock reel, are not shown. In the figures of the drawing, the polymeric layer on the inside of the process product is also not shown, in order to simplify the drawing. The elements shown in the figures of the drawing, especially the thicknesses of the liquid layers 9 and 17 or 21, and the height of the partially flattened tubing 21, are not shown to scale.

While the invention has been particularly shown and described with preferred embodiments thereof, it will be understood by those skilled in the art that various changes in form and detail may be made therein without departing from the spirit and scope of the invention as defined by the appended claims.

What is claimed is:

1. A process for forming an uninterrupted coating of uniform thickness on the inside of a length of tubing essentially consisting of cellulose hydrate, comprising the steps of:

forming a loop of tubing having a cavity therein with a downwardly inclined portion and an upwardly inclined portion;

filling the cavity of the tubing forming the loop with a coating liquid;

transporting the tubing along its longitudinal axis in a substantially vertically upward direction to coat the inside of the tubing, above the level of the coating liquid, with an initial layer of coating liquid;

constricting the tubing to lay partially flat along a narrow zone running transverse to the direction of transportation above the level of the coating liquid to retain the greater part of the coating liquid in the constriction zone and form a thin layer of coating liquid of desired thickness on the inside of the tubing issuing from the constriction zone;

filling the cavity of the tubing immediately upon issuance from the constriction zone with support gas in order to at least partially inflate the tubing; and exposing the tubing to the action of heat at a sufficiently high temperature to fuse the coating layer to the inside of the tubing and form an uninterrupted film of uniform thickness on the inside of the tubing.

2. A process as recited in claim 1, further comprising the step of:

moistening the tubing after heating.

3. A process as recited in claim 1, wherein said coating liquid comprises an aqueous polymeric dispersion having a content of dispersed polymer of at least 20% by weight relative to the total weight of the dispersion.

4. A process as recited in claim 1, wherein said coating liquid comprises an aqueous polymeric dispersion having a content of dispersed polymer in the range of about 20 to 60% by weight relative to the total weight of the dispersion.

5. A process as recited in claim 1, wherein the step of transporting comprises:

transporting the tubing at a constant speed in the range of about 8 to 120 m/min.

6. A process as recited in claim 1, wherein the constriction step comprises:

guiding the tubing through a constriction zone formed by a pair spaced rolls arranged on either side of the tubing to gradually flatten the tubing and prevent the formation of folds in front of the constriction zone.

7. A process as recited in claim 6, wherein the rolls are spaced sufficiently to insure that the thin layer of coating liquid on the tubing issuing from the constriction zone has a thickness corresponding to a weight per unit area in the range of about 6 to 20 g of dispersed component per m² of tubing surface.

8. A process as recited in claim 1, further comprising the step of:
smoothing the thin layer of coating liquid on the inside of the tubing issuing from the constriction zone but before heating to provide a coating of uniform thickness.

9. A process as recited in claim 8, wherein the smoothing step comprises:
passing the tubing between a pair of rolls positioned on either side of the tubing and in contact with the outer wall thereof to partially lay flat the tubing and transmit a frictional force thereto.

10. A process as recited in claim 9, wherein the rolls are across from each other.

11. A process as recited in claim 10, wherein the rolls are displaced from one another along the longitudinal axis of the tubing.

12. A process as recited in claim 3, wherein the coating step comprises moistening the tubing with the aqueous polymeric dispersion, the tubing having a water retention value in the range of about 120 to 140% resulting in a water content, before the heating step, in the range of about 20 to 30% of the water retention value.

13. An apparatus for coating the inside of a length of tubing, comprising:
means for forming a loop of tubing having a cavity therein with a downwardly inclined portion and an upwardly inclined portion;
means for filling the tubing cavity forming the loop with a coating liquid;
means for transporting the tubing along its longitudinal axis in a substantially vertically upward direction;
a metering device having a pair of rolls positioned on either side of the tubing to form an adjustable constriction zone to partially lay flat the tubing;
means for filling the cavity of the tubing immediately upon issuance from the constriction zone with support gas in order to at least partially inflate the tubing; and
a heater positioned after said metering device.

14. An apparatus as recited in claim 13, further comprising means for smoothing the coating on the inside of the tubing, said smoothing means being positioned after said metering device and before said heater.

15. An apparatus as recited in claim 14, wherein said smoothing means comprises a pair of rotatable smoothing rolls positioned on either side of the tubing and in contact with the outer surface thereof to partially lay flat with tubing.

16. An apparatus as recited in claim 13, wherein said rolls of said metering device are drivable.

17. An apparatus as recited in claim 13, further comprising:
a spray device positioned after said heater for moistening the tubing.

18. An apparatus as recited in claim 17, further comprising:
means for pressing the tubing flat along its width, said pressing means being positioned after said spray device.

19. An apparatus as recited in claim 15, wherein said smoothing rolls are made of steel.

* * * * *